United States Patent
Bigby et al.

(10) Patent No.: US 9,922,331 B2
(45) Date of Patent: Mar. 20, 2018

(54) FILTER FOR USER INFORMATION BASED ON ENABLEMENT OF PERSISTENT IDENTIFICATION

(75) Inventors: Michael Bigby, San Jose, CA (US); John Patrick Connelly, Santa Cruz, CA (US)

(73) Assignee: Blue Kai, Inc., Bellevue, WA (US)

( * ) Notice: Subject to any disclaimer, the term of this patent is extended or adjusted under 35 U.S.C. 154(b) by 1632 days.

(21) Appl. No.: 12/612,600

(22) Filed: Nov. 4, 2009

(65) Prior Publication Data
US 2011/0106616 A1    May 5, 2011

(51) Int. Cl.
| | |
|---|---|
| G06Q 30/00 | (2012.01) |
| G06Q 30/02 | (2012.01) |
| G06Q 10/10 | (2012.01) |
| G06F 11/34 | (2006.01) |

(52) U.S. Cl.
CPC ......... *G06Q 30/02* (2013.01); *G06F 11/3409* (2013.01); *G06Q 10/107* (2013.01); *G06Q 30/0251* (2013.01); *G06Q 30/0255* (2013.01); *G06Q 30/0269* (2013.01); *G06Q 30/0277* (2013.01)

(58) Field of Classification Search
CPC ....................... G06Q 30/0241; G06Q 30/0251
USPC ........................ 705/14.4, 14.49, 14.53, 14.67
See application file for complete search history.

(56) References Cited

U.S. PATENT DOCUMENTS

| | | | | |
|---|---|---|---|---|
| 7,418,454 | B2 * | 8/2008 | Chen ................... | H04L 67/2804 |
| 7,996,456 | B2 * | 8/2011 | Gross ................... | G06Q 10/107 |
| | | | | 709/200 |
| 8,200,661 | B1 * | 6/2012 | Pearce .............. | G06F 17/30867 |
| | | | | 707/721 |
| 2003/0171990 | A1 * | 9/2003 | Rao .................... | G06Q 30/0202 |
| | | | | 705/14.46 |
| 2004/0139025 | A1 * | 7/2004 | Coleman ............. | G06F 21/6254 |
| | | | | 705/51 |
| 2004/0181598 | A1 * | 9/2004 | Paya et al. .................... | 709/227 |
| 2005/0159996 | A1 * | 7/2005 | Lazarus ................ | G06Q 30/02 |
| | | | | 705/7.31 |
| 2006/0036875 | A1 * | 2/2006 | Karoubi ........................ | 713/191 |
| 2006/0282533 | A1 * | 12/2006 | Steelberg ........... | G06Q 30/0264 |
| | | | | 709/224 |
| 2007/0239722 | A1 * | 10/2007 | Phillips ............................ | 707/9 |

(Continued)

Primary Examiner — Luis A Brown
(74) Attorney, Agent, or Firm — Kilpatrick Townsend & Stockton LLP

(57) ABSTRACT

A method, system, apparatus, and storage medium for determining that a client device is enabled for persistent identification, and that may operate as a filter for user information based on whether the client is enabled for persistent identification. A first communication is received regarding a request by the client for a web page. At least one application level data structure is then provided for storage by the client, that persistently identifies at least one characteristic of the client. A second communication is then received that includes a representation of the application level data structures provided, and a comparison is made between the data structures provided and the representation received to determine whether the client is enabled for persistent identification. If persistent identification is enabled, the client may then be provided with advertisements or other content related to the client interests or characteristics.

23 Claims, 7 Drawing Sheets

(56) References Cited

U.S. PATENT DOCUMENTS

| | | | |
|---|---|---|---|
| 2008/0046581 A1* | 2/2008 | Molina | H04L 63/08 709/229 |
| 2008/0102947 A1* | 5/2008 | Hays et al. | 463/31 |
| 2008/0189169 A1* | 8/2008 | Turpin | G06Q 30/02 705/7.33 |
| 2008/0201731 A1* | 8/2008 | Howcroft | H04H 60/46 725/13 |
| 2008/0235243 A1* | 9/2008 | Lee | G06F 17/30867 |
| 2008/0249832 A1* | 10/2008 | Richardson | G06Q 30/02 705/14.46 |
| 2008/0275753 A1* | 11/2008 | Protheroe | G06Q 30/02 705/14.69 |
| 2009/0013377 A1* | 1/2009 | Rouhana, Jr. | G06F 21/6263 726/1 |
| 2009/0070334 A1* | 3/2009 | Callahan | G06F 21/604 |
| 2009/0076907 A1* | 3/2009 | Litwin | H04N 21/266 705/14.69 |
| 2009/0094196 A1* | 4/2009 | Piwowarski | G06F 17/30864 |
| 2009/0172728 A1* | 7/2009 | Shkedi et al. | 725/34 |
| 2009/0271414 A1* | 10/2009 | Benson | 707/10 |
| 2010/0125665 A1* | 5/2010 | Simpson | G06F 11/3409 709/224 |
| 2010/0198655 A1* | 8/2010 | Ketchum | G06Q 20/10 705/14.58 |
| 2010/0293057 A1* | 11/2010 | Haveliwala | G06F 17/30867 705/14.66 |
| 2010/0325276 A1* | 12/2010 | Aarni | G06F 9/54 709/226 |
| 2011/0035273 A1* | 2/2011 | Parikh | G06Q 30/02 705/14.42 |
| 2011/0106616 A1* | 5/2011 | Bigby | G06Q 30/02 705/14.49 |
| 2011/0119136 A1* | 5/2011 | Eldreth | G06Q 30/02 705/14.69 |
| 2011/0131205 A1* | 6/2011 | Iyer | G06F 17/30663 707/728 |
| 2011/0137953 A1* | 6/2011 | Bobick | G06F 8/60 707/799 |
| 2011/0225026 A1* | 9/2011 | Ketchum | G06Q 30/02 705/14.4 |
| 2011/0302236 A1* | 12/2011 | Shrum, Jr. | H04N 21/2343 709/203 |
| 2011/0302274 A1* | 12/2011 | Lee | H04N 21/25816 709/217 |
| 2012/0042001 A1* | 2/2012 | Carter | G06Q 10/10 709/202 |
| 2012/0054627 A1* | 3/2012 | Priyadarshan | G06Q 30/02 715/738 |
| 2012/0166273 A1* | 6/2012 | Zadikario et al. | 705/14.45 |

* cited by examiner

FILTER FOR USER INFORMATION BASED ON ENABLEMENT OF PERSISTENT IDENTIFICATION

FIELD OF ART

The present invention is directed to managing the exchange of information, and more particularly, to filtering user information based on a determination that the user is enabled for persistent identification.

BACKGROUND

Data is often a hidden and fragmented entity on the web. Even the largest web publishers, despite having robust profiles of their user's behavior on their site, often fail to capture the context of user's behavior on other sites across the web. Publishers and advertisers have historically been discouraged from sharing their data because of issues such as a lack of a marketplace-determined dollar value for their data, difficulty in buying and selling data, and sensitivity to consumer's privacy concerns. It is with respect to these considerations and others that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF EMBODIMENTS

Figure 1:
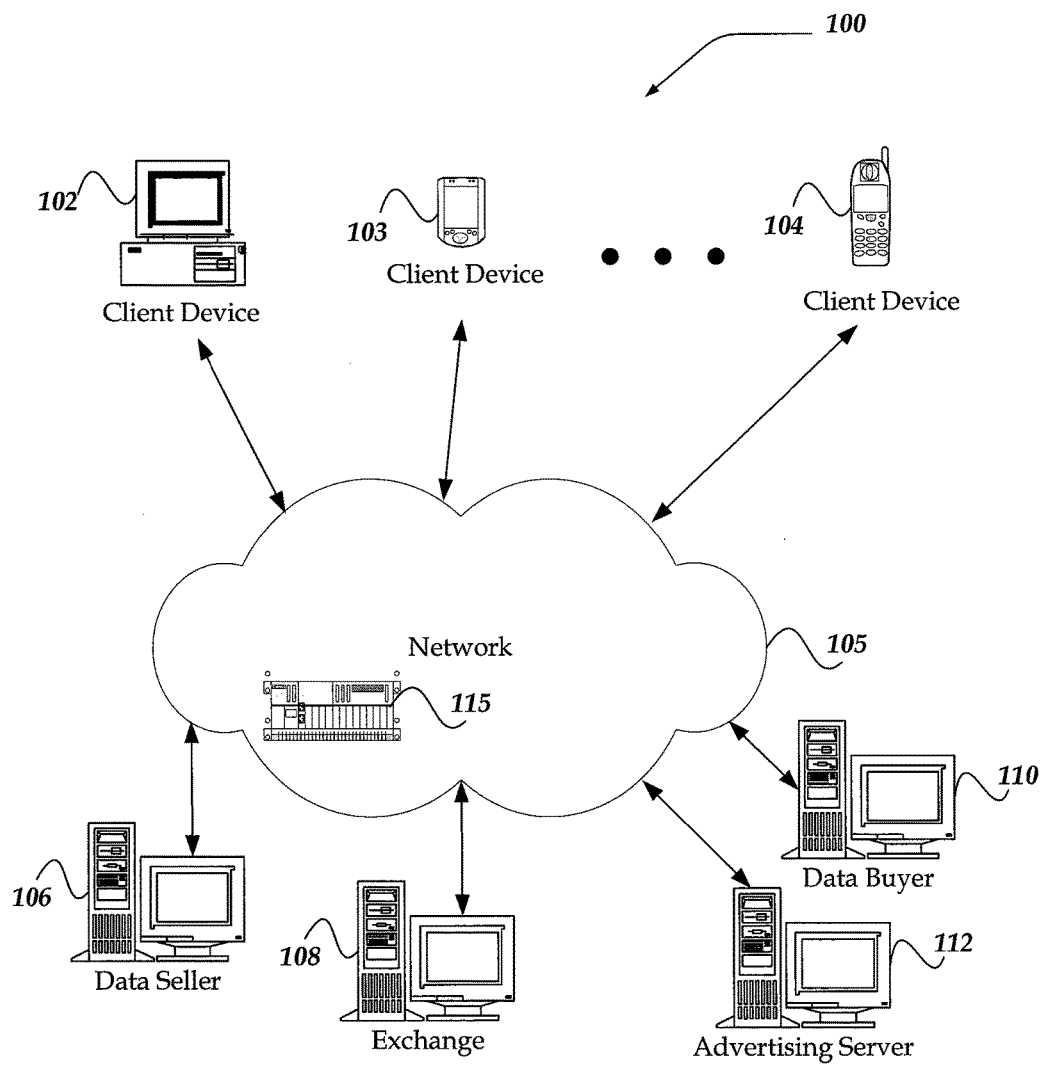
FIG. 1 illustrates a diagram of one embodiment of an exemplary environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, devices, systems, or processor/computer readable storage media. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise:

User data—A piece of information associated with a user. User data may be a word, a phrase, a name, a numeral, a date/time, a symbol, any other indicator, or any combination of same. User data may function as a user identifier, a user name, a user attribute, an indicator of a user's behavior, purchase or action, or any other indicator that a data seller may associate with a user, or any combination of these. User data may be associated with a user who visits a data seller's web site, who visits a data seller's physical place of business, who purchases or uses a data seller's products or services, who expresses an interest (either explicitly or implicitly through behavior) in a data seller's products or services, or who is otherwise tracked by the data seller by any means and for any purpose. An element of user data may also be referred to as a tag. Raw user data may be user data that has not yet been associated with one or more categories, subcategories, and/or supercategories.

User data type—A type of user data, such as a search type, browse type, demographic type, purchase type, or any other type of user data. For example, a search type may include user data about a time, place, manner or frequency of a user's search for certain information on a data seller's website. In at least some embodiments, a user data type may also be a category, subcategory, or super-category.

Category—A subject or a topic of user data. For example, user data for a particular user who purchased an SUV may be associated with a category of "SUV consumer." The exchange service itself may associate raw user data with one or more categories. In addition, association of raw user data with one or more categories may also be by a data seller, a data buyer, a customer of a data buyer, or some other user of the exchange service. Association of raw user data with a category may also be referred to as tagging the raw user data, and user data that has been associated with a category may also be referred to as tagged user data or tagged data.

Subcategory—A subset of a category. For example, user data associated with a category of "SUV consumer" may be also be associated with a subcategory of "SUV".

Supercategory—A superset of one or more categories. For example, user data associated with a category of "SUV consumer" may also be associated with such supercategories as "automobile consumer" or "automobile". One or more categories and/or subcategories may be aggregated into supercategories by the exchange service, by a data seller/data provider, data buyer, or other user of the exchange service. Because any category may also be considered to be a subcategory and/or supercategory depending on its position within some hierarchy of categories/subcategories/supercategories, the term category as used herein may refer generally to a category and/or a subcategory and/or a supercategory.

Segment—A grouping or collection of one or more categories or sub-categories. A data seller, data buyer, customer of a data buyer, or other user of the exchange, or the exchange itself, may indicate a combination of categories, sub-categories with boolean operations such as AND, OR, XOR, or NOT to make a segment. A segment may include categories/sub-categories which include tags of the same type or of different types. User data from one or more segments may be selected or otherwise requested by a data buyer who bids on user data.

Application Level Data Structure (ALDS)—A data structure that may be provided to a client through operation of an application communicating at the application layer (e.g. layer 7) of the Open System Interconnection (OSI) network model. An ALDS may conform to a particular format, for example an HTTP cookie. The ALDS may also be another type of data structure that uniquely identifies the client and/or the user. The ALDS may be received and processed by a web browser in accordance with an application-layer protocol, such as HTTP. The ALDS may include data in a readable text format, for example where the ALDS is an HTTP cookie. The ALDS may also include data in a binary and/or machine-readable format. The ALDS may be provided in a compressed format, such as the ZIP compression format. The data of the ALDS may be encrypted. Non-limiting, non-exhaustive examples of an ALDS include a cookie (e.g., an HTTP cookie), a Uniform Resource Locator (URL), a query string, a flash local stored object, or a session bean (e.g., a Java session bean), and any other data structure, as well as any portion of any of these that is accessible to programs at the application layer.

Briefly stated, in certain embodiments the invention is directed to a method, system, apparatus, and storage medium for determining that a client (e.g. a client device of a user) is enabled for persistent identification, and that may operate as a filter for user information based on whether the user is enabled for persistent identification. In some embodiments, the method (or an apparatus, system or storage medium implementing the method) may include receiving a first communication regarding a request by the client for a web page. At least one application level data structure (ALDS) may then be provided for storage by the client, the ALDS(s) persistently identifying at least one characteristic of the client (e.g., user identification information, information regarding user interests, purchases, browsing activities, or the like). The ALDS(s) may be provided and/or stored in encrypted and/or compressed form. In some embodiments, an ALDS may be an HTTP cookie.

After the ALDS(s) have been provided, the process may receive a second communication that includes a representation of the at least one ALDS that is stored at the client. A correspondence may then be determined between the provided ALDS(s) and the received representation. If the correspondence is determined to be relatively equivalent, the process may enable at least one advertisement to be provided to the client based on the at least one characteristic of the client. Correspondence may be determined through use of one or more data values that may be numeric representations of the ALDS(s) provided and/or the representation received. Such numeric representations may be checksums, and may enable determination of the correspondence exactly or at least to a certain confidence threshold level. Enabling at least one advertisement to be provided may include making one or more modifications to the ALDS(s) stored on the client. In some embodiments, enabling at least one advertisement to be provided may include providing the requested web page to the client including a particular data element such as a pixel (e.g. beacon). In this way, the determination of whether the client is enabled for persistent identification may facilitate the selling of user data to one or more data buyers, to target advertisements or other content to the user based on the user data collected by means of the persistent identification.

In some embodiments, the first and second communications may be enabled through the inclusion of particular metadata tags in web pages of data sellers. These metadata tags may, for example, be HTML tags such as <iframe> tags that cause a call to be made to a server (e.g. an exchange server) referenced in the tag. Inclusion of two such metadata tags in the same web page may facilitate the determination that the client is enabled for persistent identification on the client's first (and in some cases, only) visit to the web page, as described further herein.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 may include client devices 102-104, network 105, one or more seller device(s) 106, a data exchange device/server 108, and one or more buyer devices such as buyer device 110, and one or more advertising servers such as advertising server 112. Network 105 is in communication with and enables communication between each of client devices 102-104, seller device 106, data exchange device/server 108, buyer device 110, and advertising server 112.

Client devices 102-104 may include any computing device capable of receiving and sending a message over a network, such as network 105, to and from another computing device, such as seller device 106, exchange device 108, buyer device 110, advertising server 112, each other, and the like. The set of such devices may include devices that typically connect using a wired communications medium such as personal computers, multiprocessor systems, microprocessor-based or programmable consumer electronics, network PCs, and the like. Similarly, client devices 102-104 may be any device that is capable of connecting using a wired or wireless communication medium such as a personal digital assistant (PDA), pocket PC, wearable computer, and any other device that is equipped to communicate over a wired and/or wireless communication medium. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 105 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 105 includes any communication method by which information may travel between client devices 102-104, seller device 106, exchange device 108, buyer device 110, and/or advertising server 112. Network 105 may include one or more network management devices 115, which may include network providers, load balancers, application managers, or the like. Network management devices 115 may manage communication sessions, tag communication traffic, place data cookies on client devices, and perform other network management operations.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data. Such data can be communicated through communication media in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

Seller device 106, exchange device 108, buyer device 110, and advertising server 112 may comprise multiple computing devices (e.g., a cluster of multiple computing devices), components of a single computing device, or a single device with multiple software features. Seller device 106 may provide content such as web sites, online journals (e.g., blogs), photos, reviews, online services such as messaging, search, news, shopping, advertising, travel services, or the like. While providing such content or services, seller device 106 may gather information about client users, such as products viewed, articles read, or the like. The gathered information may be used to determine behaviors, create profiles, or enhance the user information. Exchange device 108 may organize or reorganize the user data from one or more sellers, and may enable a seller to auction, or otherwise provide, the user information to one or more buyers. Buyer device 110 may enable buyers to review, bid on, or otherwise access the user information. Advertising server 112 may provide advertisements, promotional information or generally other content to client devices 102-104, based on buyer bids, campaigns, or other factors. In some embodiments, advertising server 112 may reside on the same device or within the same cluster of devices with buyer device 110, or advertising server 112 may be a separate device managed by the buyer. In some embodiments, advertising server 112 may be managed and/or hosted by an entity other than the buyer.

Exchange device/server 108 may also be configured to determine whether one or more of client devices 102-104 are enabled for persistent identification. Such a determination may facilitate the gathering of user information regarding users of client devices 102-104 and the organization of such user information by exchange device/server 108. This determination is further described herein.

Any one of these devices such as buyer device 110, exchange device 108 and/or advertising server 112 may be a server and/or client, but to simplify the discussion of example embodiments, they are generally referred to herein as servers. Briefly, each server may comprise any computing device capable of connecting to network 105 and may manage content or provide services for a network user, such as a user of at least one of client devices 102-104. Devices that may operate as a server include dedicated servers, personal computers, desktop computers, rack-mounted computers/processors, multiprocessor systems, microprocessor-based or programmable consumer electronics, network PCs, and the like, or any networked clusters of the same.

Illustrative Client Device

Figure 2:
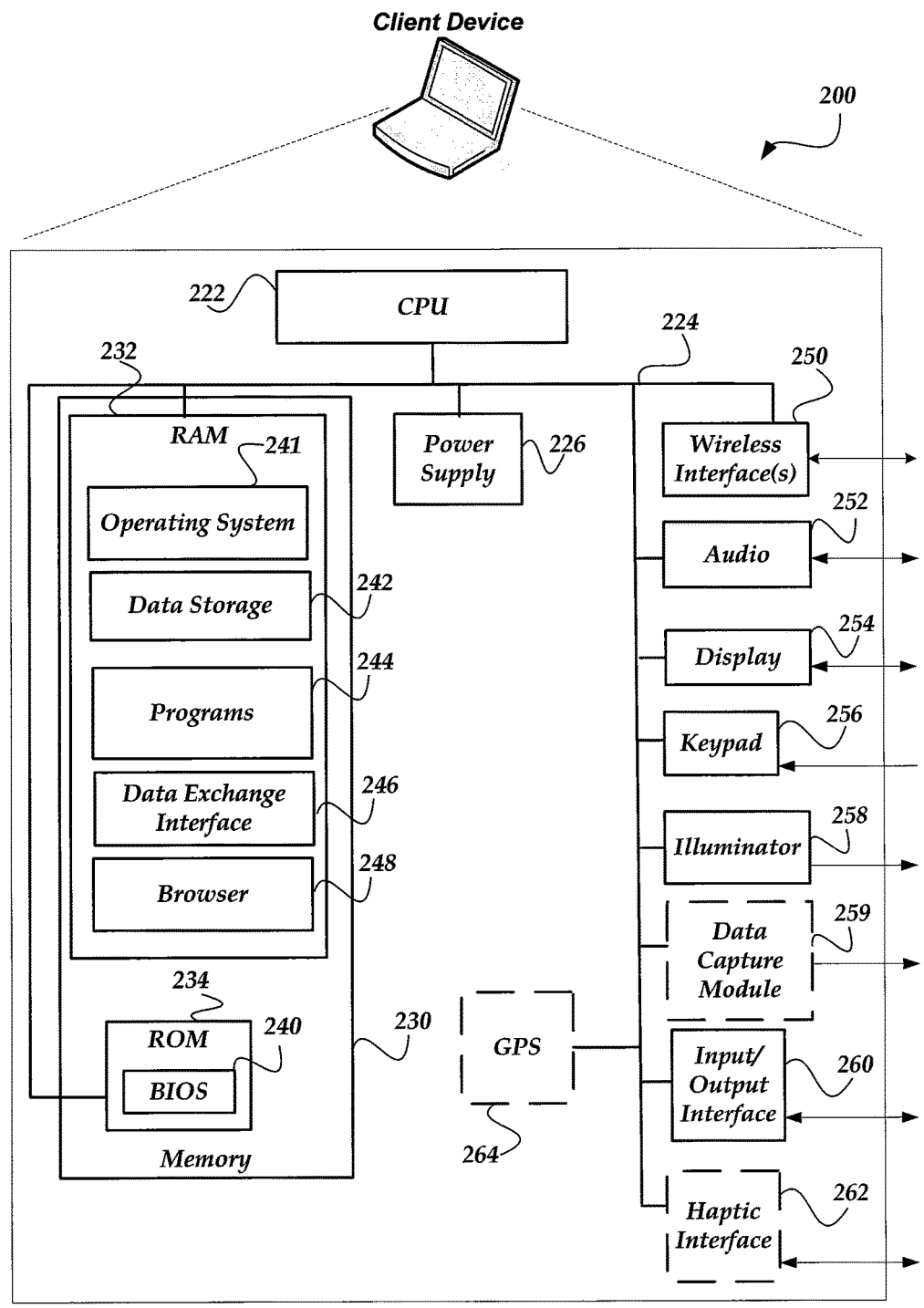
FIG. 2 shows a schematic diagram of one embodiment of an exemplary client device.

FIG. 2 shows an example client device 200, according to one embodiment of the invention for use as a reference data collector device, end user device, or other type of client device. In one embodiment, client device 200 is a mobile device, such as a laptop computer. Another example of a mobile device includes a PDA or a cellular telephone that is arranged to send and receive voice communications and messages such as SMS or MMS messages via one or more wireless communication interfaces. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Generally, client device 200 may comprise any mobile or stationary electronic device. Such devices include personal computers, laptops, palmtops, PDAs, hand-held computers, cellular telephones, smart phones, pagers, radio frequency (RF) devices, infrared (IR) devices, integrated devices combining one or more of the preceding devices, and the like. Client device 200 may also comprise other electronic devices such as multiprocessor systems, microprocessor-based or programmable consumer electronics, network PCs, wearable computers, gaming/entertainment consoles, and the like.

Client device 200 may include many more, or fewer, components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of Windows®, UNIX, or LINUX®, or a specialized mobile communication operating system such as Windows Mobile™, the Symbian® operating system, or the like. The operating system may include, or interface with a Java virtual machine module that enables control of hardware components and/or operating system operations via Java application programs.

Memory 230 further includes one or more data storage units 242, which can be utilized by client device 200 to store, among other things, programs 244 and/or other data. Programs 244 may include computer executable instructions which, when executed by client device 200, transmit, receive, render, and/or otherwise process markup pages such as HTML pages, XML pages, WAP pages (sometimes referred to as WAP cards), and the like. Accordingly, programs 244 may include a browser program 248 of computer executable instructions, which may be run under control of operating system 241 to enable and manage requesting, receiving, and rendering markup pages and messages (e.g., HTTP, TCP/IP, SMS, MMS, IM, email, and/or other messages), audio, video, text, and/or other types of data, and may enable communication with another user of another client device. Browser program 248 may include functionality for receiving, sending, storing, updating, and generally processing application level data structures (ALDS) (for example, HTTP cookies) associated with a remote server. Such ALDS may be stored locally on the client device 200, for example in data storage 242, as described further herein. Other examples of application programs 244 include messaging applications, calendars, contact managers, task managers, transcoders, database programs, word processing programs, spreadsheet programs, games, and so forth.

In addition, mass memory 230 of some clients may include a data exchange interface 246, which may be run within a browser such as browser 248, within a web page, as an external module under control of operating system 241, or via another configuration. Data exchange interface 246 enables a user to communicate with, submit user data, buy user data, manage accounts, or perform other operations available through the data exchange device.

Client device 200 also includes a power supply 226, one or more wireless interfaces 250, an audio interface 252, a display 254, a keypad 256, an illuminator 258, an optional data capture module 259, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station, or directly with another client device. Wireless interface 250 includes circuitry for coupling client device 200 to one or more wireless networks, and is constructed for use with one or more communication protocols and technologies including, but not limited to, TCP/IP, UDP, GSM, CDMA, TDMA, SMS, GPRS, WAP, UWB, IEEE 802.16 (WiMax), and the like.

Audio interface 252 is arranged to produce and/or receive audio signals such as the sound of a human voice, music, and the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a client device. Display 254 may also include a touch sensitive screen arranged to receive input from an object such as a stylus or a digit from a human hand.

Keypad 256 may comprise any input device arranged to receive input from a user. For example, keypad 256 may include a keyboard, a push button numeric dial, or the like. Keypad 256 may also include command buttons that are associated with selecting and performing changeable processes. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the mobile device to illuminate in response to actions. Illuminator 258 may further be used as a flash for image capture. An optional data capture module 259, such as a camera, may be included in client device 200. If the data capture module is included, the client device may obtain images, video, temperature, pressure, or other data.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Optional haptic interface 262 is arranged to provide tactile feedback to a user of the client device. For example, the haptic interface may be employed to vibrate client device 200 in a particular way when another user of a client device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, tri-angulation, assisted GPS (AGPS), Enhanced Observed Time Difference (E-OTD), cell identifier (CI), service area identifier (SAI), enhanced timing advance (ETA), base station subsystem (BSS), or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Illustrative Network Device

Figure 3:
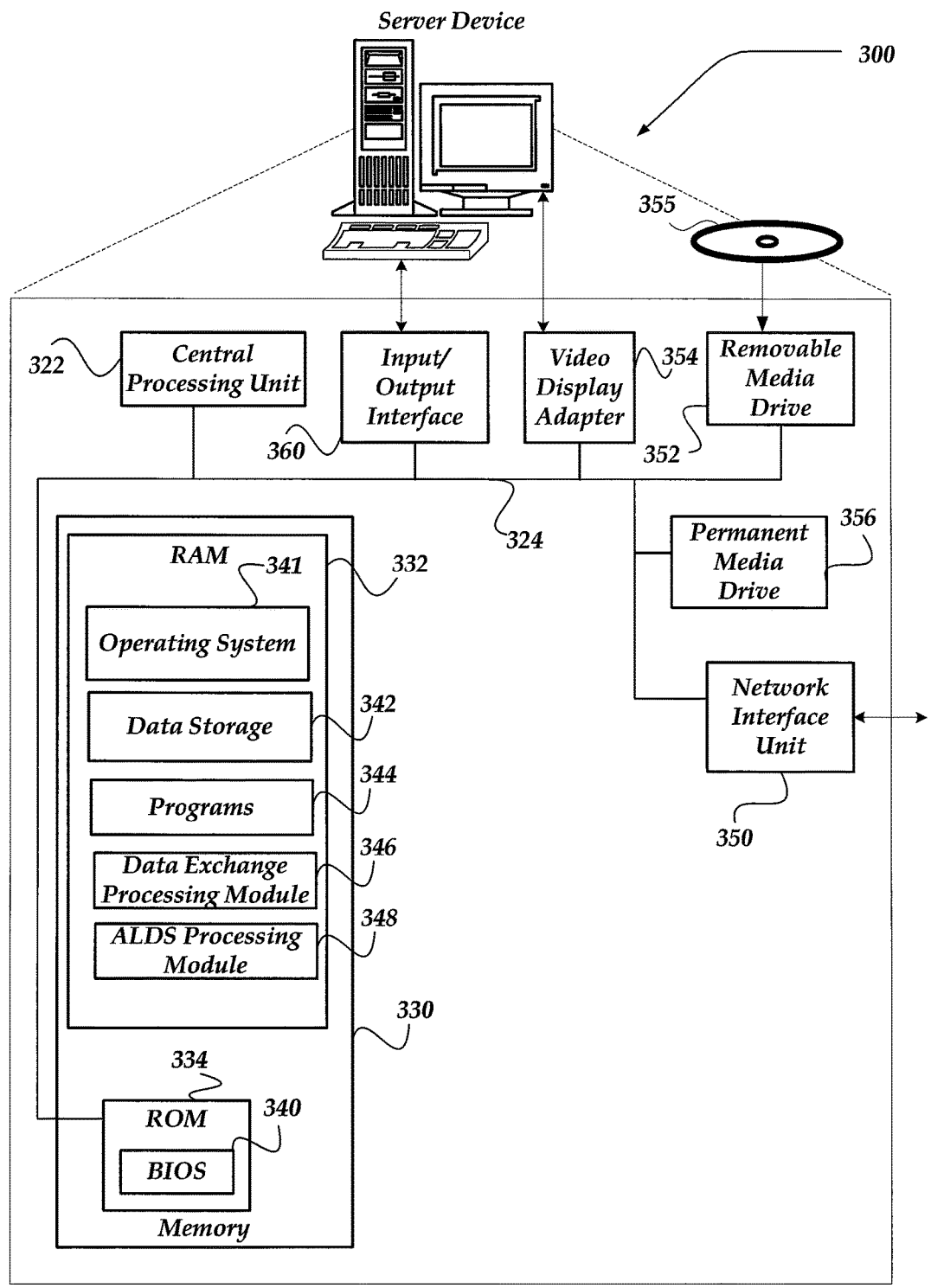
FIG. 3 illustrates a schematic diagram of one embodiment of an exemplary server device.

FIG. 3 shows one embodiment of a network device, according to one embodiment of the invention. Network device 300 may include many more, or fewer, components than those shown. The components shown, however, are sufficient to disclose an illustrative embodiment for practicing the invention. Network device 300 may represent, for example, seller device 106, data exchange device 108, buyer device 110, advertising server 112, or other device depicted in FIG. 1. For example purposes, network device 300 will be described as a server device.

As shown in the figure, server device 300 includes a processing unit 322 in communication with a mass memory 330 via a bus 324. Mass memory 330 generally includes a RAM 332, a ROM 334, and other storage means. Mass memory 330 illustrates a type of computer-readable media, namely computer storage media (e.g. computer- or processor-readable storage media). Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 330 stores a basic input/output system ("BIOS") 340 for controlling low-level operation of server device 300. The mass memory also stores an operating system 341 for controlling the operation of server device 300. It will be appreciated that this component may include a general purpose operating system such as a version of Windows, UNIX, LINUX, Solaris, or the like. The operating system may also include, or interface with a Java virtual machine module that enables control of hardware components and/or operating system operations via Java application programs.

Mass memory 330 further includes one or more data storage units 342, which can be utilized by server device 300 to store, among other things, programs 344 and/or other data. Programs 344 may include computer executable instructions which can be executed by server device 300 to implement a markup handler application, such as an HTTP handler application for transmitting, receiving, and otherwise processing HTTP communications, a WAP handler application for transmitting, receiving, and otherwise processing WAP communications, and the like. Similarly, programs 344 can include a secure socket layer (SSL) handler application for handling secure connections, such as initiating communication with an external application in a secure fashion. Other examples of application programs include content management applications, messaging applications, schedulers, calendars, web services, transcoders, database programs, word processing programs, spreadsheet programs, and so forth. Accordingly, programs 344 can process images, audio, video, or markup pages, enable telecommunication with another user of another electronic device, and/or other services.

In addition, mass memory 330 may store a data exchange processor 346. Data exchange processor 346 may include computer executable instructions, which may be run under control of operating system 341 to receive, organize, sell, or otherwise manage the exchange of user data. In one embodiment, data exchange processor 346 generally communicates data sellers and buyers to operate an auction of client user data.

In some embodiments, mass memory 330 may also store an ALDS processing module 348. ALDS processing module 346 may be a software application or program, and may include computer readable instructions, which may be run under control of operating system 341 to generate, update, receive, send, or otherwise manage one or more ALDSs. ALDS processing module 346 may also be configured to compare an ALDS with another ALDS or with a representation of an ALDS, to determine a substantial equivalence between the structures compared. As part of this comparison, ALDS processing module 346 may be configured to generate, calculate or otherwise determine a numeric value (e.g., a checksum) or other data value corresponding to and/or identifying an ALDS, and may be configured to employ such numeric values to determine a relative equivalence between ALDSs and/or representations of ALDSs. ALDS processing module 348 may also be configured to store and/or retrieve one or more ALDSs, or information contained in ALDSs, on server device 300, for example in data storage 342. Operation of ALDS processing module 348 is described further herein, in particular with regard to FIGS. 4-7.

Server device 300 may also include an input/output interface 360 for communicating with input/output devices such as a keyboard, mouse, wheel, joy stick, rocker switches, keypad, printer, scanner, and/or other input devices not specifically shown in FIG. 3. A user of server device 300 may use input/output devices to interact with a user interface that may be separate or integrated with operating system 341, programs 344, and/or other modules. Interaction with the user interface includes visual interaction via a display, and a video display adapter 354.

Server device 300 may include a removable media drive 352 and/or a permanent media drive 354 for computer-readable storage media. Removable media drive 352 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 355, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 350, server device 300 can communicate with a wide area network such as the Internet, a local area network, a wired telephone network, a cellular telephone network, or some other communications network, such as network 105 in FIG. 1. Network communication interface unit 350 is sometimes known as a transceiver, transceiving device, network interface card (NIC), and the like.

Illustrative General Exchange Operations

Exchange 108 may function generally to facilitate the exchange of user data between data sellers (e.g. data seller 106) and data buyers (e.g. data buyer 110), and also to enable the correlation of user data into categories, to facilitate providing targeted advertisements to users (e.g. from advertising server 112). Exchange 108 may receive an indication from one or more data sellers of raw user data that may be sold to data buyers through the exchange. To provide such an indication, a data seller may use a browser interface, a client application program, or other interface to register with an exchange service and input particular information about the raw user data offered for sale. The raw user data itself may include keywords, phrases, or other indicators that the data seller may associate with users who visit the data seller's web site, who use the data seller's products or services, or whose behavior is otherwise tracked by the data seller. For example, a data seller may operate an automobile dealer website and gather information about the behavior of each user that visits the website. Also, the data seller may generate additional raw data regarding the visiting user's interactions with the website. For instance, the data seller may provide a tag of "SUV consumer" to the raw data associated with a user who reviews information about sport utility vehicles (SUVs) on a website. Additionally, when inputting raw user data to the exchange service, the data seller may provide and associate one or more topical categories and/or one or more subcategories and/or one or more supercategories for the raw data that corresponds to one or more users. For example, consistent with the raw user data, the data seller may select a topical category of "automobiles," and select sub-categories of "SUV Consumer" and "SUVs." In at least some embodiments, the exchange service itself may associate one or more categories and/or subcategories and/or supercategories with the raw user data. Through this association, the exchange service may normalize the categories, sub-categories, and supercategories of raw user data provided by different data sellers.

The data seller or the exchange service may also associate the inputted raw user data with one or more user data types. User data types may describe a kind of user data, such as a search type, a browse type, a demographic type, a purchase type, or the like. As one example, a search type of raw user data may indicate raw user data describing when, or how often, a website visitor performed a search for certain information on the data seller's website. For instance, the data seller may specify "SUV consumer searched" as a search type of user data that includes information on the frequency at which a website visitor used a search feature on the data seller's website to search for SUV automobiles. Similarly, the data seller may specify "SUV consumer purchased" as a purchase type of user data that includes information on the date on which a website visitor purchased parts for an SUV through the data seller's website.

In addition, the data seller may maintain a profile of user data for each visiting user of the data seller's website. The profile may also include tags for offline information, gathered during interactions between the data seller and a user/customer other than a user's visit to the data seller's website. For example, some visiting users of the website may be registered users who are also consumers or customers at the data seller's physical store. A consumer who purchased an SUV at the data seller's dealership may register with an email address, user ID, etc. for subsequent access to service information or the like. The offline purchase may be included as user data in the consumer's profile along with online user data. Those skilled in the art will recognize that many variations of profiles, user data, tags, tag types, categories, subcategories, supercategories or other information may be configured and provided to an exchange service.

The data seller may choose one or more methods to provide raw user data or user data associated with one or more categories/subcategories/supercategories to the exchange service. The data seller may submit user data at a number of possible times, such as one time, on a monthly basis, on an hourly basis, or the like. Alternatively, user data may be fed automatically from the data seller to the exchange service, using a script or other module, at the moment a user visits the seller's website. In an example embodiment, the exchange service provides the data seller with a universal script tag. In some embodiments, this universal script tag may be an HTML metadata tag (e.g., an <iframe> tag). The data seller may place the universal script tag within a global site header or footer of the data sellers website. The universal script tag may generally cause one or more application level data structures (ALDS) (e.g., cookies) to be placed on the client devices of visitors to the data seller's website. The ALDS(s) may be separate ALDS(s) intended for use by the exchange service, may be a portion of a data seller ALDS, or other configuration. Each ALDS may store the corresponding user's profile of user data collected by the data seller, when the user interacts with the data seller's website. The ALDS may also include a user identifier that can be used by the exchange service to identify the visiting user to a winning data buyer. In addition, or alternatively, the data seller may store the user profiles in a database. At predefined times, and/or whenever a user visits the data seller's website, the profile of user data (or changes to the profile of user data) may be sent to the exchange service. In this embodiment, the data seller may provide user data in near real time as a user interacts with the data seller's website.

In another embodiment, the universal script tag may be provided to a network provider, such as an internet service provider, an application delivery provider, a network load balancing service, or the like. The network provider generally provides network services for visitor traffic that interacts with the data seller's website. Thus, the network provider may manage the cookies and/or other user tracking. The network provider may send the user data to the data seller for delivery to the exchange service. In addition, or alternatively, the network provider may deliver the user data directly to the exchange service on behalf of the data seller.

In another embodiment, a universal script, or an alternate script, may be provided to data buyers. When client users visit a data buyer website, the script may place ALDS(s) on the client device and request from the exchange service user data from data sellers regarding the visiting user. The ALDS(s) may also include a user identifier, browser session identifier, client device identifier, or other identifier. The identifier may subsequently be passed to the exchange service to determine if user data from one or more data seller's is available regarding this visiting user. This may enable a data buyer to bid on additional user data associated with this visiting user, based on the data buyer's desired user data. The additional information may enable the data buyer to present more relevant content, services, advertisements, or other information to the visiting user. The relevant information may be provided while the user is still visiting the data buyer's web site, and/or upon a return visit.

The exchange service may also provide a browser interface, a client application program, or other interface for data buyers to register with the exchange service and bid for user data. Through such an interface, the exchange service may receive information from a data buyer to configure one or more campaigns that would utilize user data from data sellers. A campaign may be a brand-awareness campaign, a sale advertising campaign, a voting campaign, or other effort to provide information to targeted users that would find the information relevant. A campaign may be specified by one or more requested user data categories, subcategories and/or supercategories that the data buyer may seek to purchase and utilize. A campaign may also be divided into segments, each of which specifies one or more categories/subcategories/supercategories. A data buyer may input or select categories/subcategories/supercategories that are relevant to the data buyer's campaign. The data buyer may also select categories/subcategories/supercategories that were previously specified by one or more data sellers. In addition, or alternatively, the data buyer may input data buyer categories that may or may not match data seller's categories or the exchange service-created categories. The exchange service can use synonyms, demographic information, or other information to determine data seller categories that may be associated with data buyer categories.

The data buyer may also submit a maximum bid, which the data buyer is willing to make for user data that matches the data buyer's requested categories of user data. In one embodiment, the maximum bid corresponds to a bid amount per user, per category, subcategory, and/or supercategory. In this case, the data buyer is willing to pay a specified maximum bid amount for each user that matches a buyer-specified category of user data. The data buyer may specify a maximum bid amount for each particular category/subcategory/supercategory of requested user data. The data buyer may also optionally specify a budget cap, indicating a maximum total amount that the data buyer is willing to spend on user information.

In some embodiments, the data buyer may specify a maximum bid amount for the buyer-specified group of categories/subcategories/supercategories for a segment of the buyer's campaign, or the buyer's entire campaign. In still other embodiments, the maximum bid may be customized for other criteria. For example, the maximum bid may correspond to a maximum amount that the data buyer is willing to pay for a predefined number of users that match a buyer-specified category (e.g., max bid per 100 users). In some embodiments, a category may be associated with varying values, such as location. The data buyer may specify a location, and a scale of bids that correspond to a distance from the buyer-specified location. This may be used for bidding on real-time user information of mobile users. Other categories associated with variable values may include frequency of visiting a website, a time since a last visit to the website, or the like.

Conversely, the data buyer may also specify a recency period of time, outside of which the data buyer may consider user data too old and no longer worth purchasing. For example, the data buyer may specify that bids will only be made for user data that was gathered, or associated with a category, within the last week. User data gathered or associated with a category longer than a week ago may then be filtered out, and would not be bid on by that data buyer. The recency period may be any other time period, including a month, a day, an hour, a minute, or the like. Similarly, the data buyer may specify a bidding time span during which the data buyer is willing to bid on user data with the buyer-specified categories. The bidding time span may be a date range, a time of day, certain days of the week, or other time span. The bidding time span may be specified as a recurring period, such as each weekend.

After completing data buyer configurations, the exchange service may receive bids from data buyers. A bid may be received (or generated from a standing order) as a result of a user visiting a data seller website, triggering the universal script tag on the seller website to set (or check) a cookie on the visiting user's client, and to pass the cookie information (e.g., a user identifier and/or user data) to the exchange service. This may trigger the start of an auction among currently active data buyers. Alternatively, receiving cookie information may simply cause the exchange service to store the information, and await a request from a data buyer.

Further, a bid may be received as a result of a user visiting a data buyer website, triggering the universal script on the buyer website to set (or check) a cookie on the visiting user's client, and to pass the cookie information (e.g., a user identifier and/or user data) to the exchange service to determine whether other information is available from data sellers about this particular user. In another case, a predefined standing bid may be generated in the exchange service if a network service detects a user visit to either a data seller or a data buyer, and relays the cookie information to the exchange service.

A buyer bid is generally intended to obtain user identifiers, user data, categories of user data, and/or other user data for those users that match the data buyer's predefined choice of categories/subcategories/supercategories of user data. In at least some embodiments, a data buyer may establish a standing bid at a chosen price, and that standing bid may then be automatically entered by the exchange service each time a matching user visits a seller or buyer site. In addition, a data buyer's account may be checked when a bid is entered, to ensure that the data buyer has sufficient funds to participate. A bid may be valid for a predefined window of time, such as a month, a week, a day, an hour, or the like.

The bids may be evaluated to create a market price and scarcity of user data. For example, the exchange service may predefine a top number (n) of buyers that will be allowed to win user data. The highest prices that are bid by the top n buyers may define a range of bid prices that are required for a buyer to win any user data. Thus, the buyer with the nth highest bid may establish a minimum bid price to win user data. Any lower bidders who bid below this minimum bid price may not receive any user data that they bid on. In one embodiment, the top n bidders may be determined for those bids that include at least one category/subcategory/supercategory that is desired by all of the bidders. In at least some embodiments, lower bidders may be excluded based only on price, even if there are no overlapping category among the competing bids.

The minimum price, or price range for the top n bidders may be determined based on a predefined price window of time. For example, only bids that are currently still active, and that have been offered during the last thirty days may be evaluated to determine the minimum price, or price range of the top n bidders. In another embodiment, any bid (even inactive bids) that were offered during the predefined price window may be used to determine the minimum price, or price range that currently active bidders may satisfy to obtain any user data. This creates a market value for the user data based on a scarcity of access to the user data. Minimum price may also be determined through price floors set by the exchange service or by a data seller. For example, a particular data provider may choose not to sell user data below a particular price. A price floor may be set for one or more user segments, one or more categories/subcategories/supercategories, or for any grouping categories/subcategories/supercategories.

In one embodiment, any bidder that satisfies the minimum bid price may obtain user data within the one or more categories that match the bidder-specified categories. In one case, the user data may simply identify each user that matches the bidder-specified categories. The user data may also include user data in other categories that the bidder did not bid on, so that the winning bidder receives additional information about the matching users. In another embodiment, only the bidder with the highest bid price may obtain user data for those users match the winning bidder's specified one or more categories.

In an alternate embodiment, the data buyers may specify that a bid is intended to obtain all user data of a top x number of users that have user data associated with the buyer-specified categories. The top users may be determined as the most recent users to visit a data seller, or other criteria. In another embodiment, a winning bidder may exclude other buyers from obtaining any of the user data for the top x users. This may create another form of a scarcity of user data, which may also affect a market value of that user data. In another embodiment, buyers may obtain user data for exclusive and/or non-exclusive use. The exclusive use of the user data may also be limited to a predefined period, a seller-specified period, a buyer-specified period, an exchange-specified period, or other period.

Similarly, after completing data seller configurations, the exchange service may have already received user data. In addition, or alternatively, the exchange service may receive an ongoing stream of user data, such as user profiles in ALDS(s), from data sellers or from network providers. This user data may be raw user data, and the exchange service may associate the raw user data with one or more categories. User data received from data sellers may be matched with one or more categories requested by data buyers and specified in data buyers' campaigns. This matching may be an exact matching, or it may be a less exact association of user data with buyer-specified categories. For example, received user data does not exactly match any buyer-specified category, the exchange service may create a mapping by using synonyms, location information, time information, and/or other contextual data to associate the seller-specified user data with one or more buyer-specified categories.

The exchange server may determine one or more winning data buyers based on bids received from the data buyers and on the results of the matching operations. The exchange service may then determine those data buyers that have requested one or more categories of the user data. Data buyers may have specified that they wish to bid on user data that is associated with each buyer-specified category. Alternatively, some data buyers may have specified that they wish to bid on user data that is associated with some or all categories, subcategories or supercategories specified for a campaign. The exchange service may filter the data buyers according to their requested categories. The exchange service may also send messages to inform bidding data buyers of other bidders, and allow data buyers to adjust their bids. In one embodiment, this auction process is real-time and continuous as users visit websites of data sellers and/or data buyers. In another embodiment, this auction process may be open for a predefined period, or until another criterion is met.

Based on the data buyers' bids, the exchange service may rank the data buyers. As indicated above, the exchange service may impose a predefined limit (n) on the number of buyers with the highest bids, to set the minimum price required to win any user data. Thus, at least the top n data buyers with the highest bids may win the user data for one or more individual users or one or more user segments that have user data associated with one or more categories requested by a winning buyer. If additional data buyers also made bids at the minimum price, the additional data buyers may also win user data.

In one embodiment, the highest bidder may retain access to user data for one or more matching users, for as long as no other buyer bids a higher amount for one of the categories associated with those users' data. In another embodiment, the winning bidder may retain the user data for a predefined exclusive-use period, before bidding is opened again to other buyers. In one embodiment, each buyer may be informed of the percent of the price window time that their bid price allowed them to win a user's data. If that percent is less than a 100%, that buyer may be urged to bid higher in order to win a higher percent of the target users. In one embodiment, the winning buyer may be charged the highest bid amount. In another embodiment, the winning buyer may be charged the amount that corresponds to the second-highest bidder.

In at least some embodiments, different bidding data buyers may have access to differing amounts of user data. The amount available to each bidder may depend at least in part on their bid. This may allow a deeper range (or greater number) of bidders to participate at least in part, and mirrors the behavior in search auctions. For example, each successively ranked bidder may be eligible to receive less user data than the previous bidder (e.g., the top bidder may have access to more user data than the second highest bidder, who has access to more user data than the third highest bidder, and so forth). The amount of user data available to each bidder may be determined using various mathematical formulae. For example, the amount of user data available to each bidder may be determined through a geometric decay calculation, such that the amount of user data available is reduced by a certain percentage for each successive bidder (e.g., if the decay percentage is 10%, the top bidder may be able to buy 100% of the user data, the second highest bidder 10% less–90%, the third highest bidder 81%, the fourth highest bidder 72.9%, and so forth).

In another embodiment, the exchange service may limit the number of times that user data for an identified user or user segment is sold to a particular bidder, or any bidder. For example, a bidder might be limited to ten wins of user data associated with a particular user or user segment. Websites often churn cookies, so a bidder may continue to win a user or user segment, unless the limit prevents additional wins. This may benefit other bidders and may also benefit certain users, who may otherwise receive the same advertisements or other information more often than they might prefer.

The exchange service may also cause the winning bidder to be charged for, and to receive the user data for each user for which they have won the bid. The exchange service may deliver the user data, may instruct the data seller to deliver the user data, may instruct the network provider to deliver the user data, or otherwise cause the user data to be delivered. Similarly, the accounting may be done by the exchange service, or another service.

The exchange may also cause updated user data to be delivered to the winning bidder for those users that have been won. The exchange may further allow the winning bidder to have access to the user data for a predefined period of usage time. After the predefined usage period expires, a second highest bidder, or additional bidders may be allowed access to the user data. Thus, the winning bidder may have exclusive access to the freshest user data for the predefined period. Subsequently, the winning bidder may have to re-bid for another period of access to the user data. That previously winning bidder may have to alter its bids to compete against other bids.

Illustrative Logic Operations

To implement the functionality of the exchange 108, as described herein, there may be a need to persistently identify certain users, such as users of client devices 102-104, who visit web sites such as those of data seller 106. Such persistent identification may allow user data to be collected for the user and/or the user's client when the user visits various web sites, and may allow the user data to be processed, correlated, and/or sold by an entity such as an operator of exchange 108 of FIG. 1. Further, it may be necessary to determine whether a client device is enabled for persistent identification, in some embodiments as a preliminary step before collecting data regarding the client and its activities on the web site. For example, in some cases a user may be operating a client device's web browser in a private mode, in which the web browser has been configured to disable the saving of application level data structures (ALDS) (e.g., third party cookies) to the client device. As another example, some types of web browsers may not allow the storage of ALDSs on the client device, and may not even accept an ALDS sent as part of a web page. As another example, certain web browsing activities may be part of an automated process (e.g., a web "bot" or "spider") running on a client to request content from one or more web sites as part of a search or data collecting activity, or for malicious reasons (e.g., a denial-of-service attack). Because the activities of such a process may not be associated with a particular user who is a consumer, and because user data for such a process may not be of value, it may be advantageous to not enable such a client for persistent identification.

Figure 4:
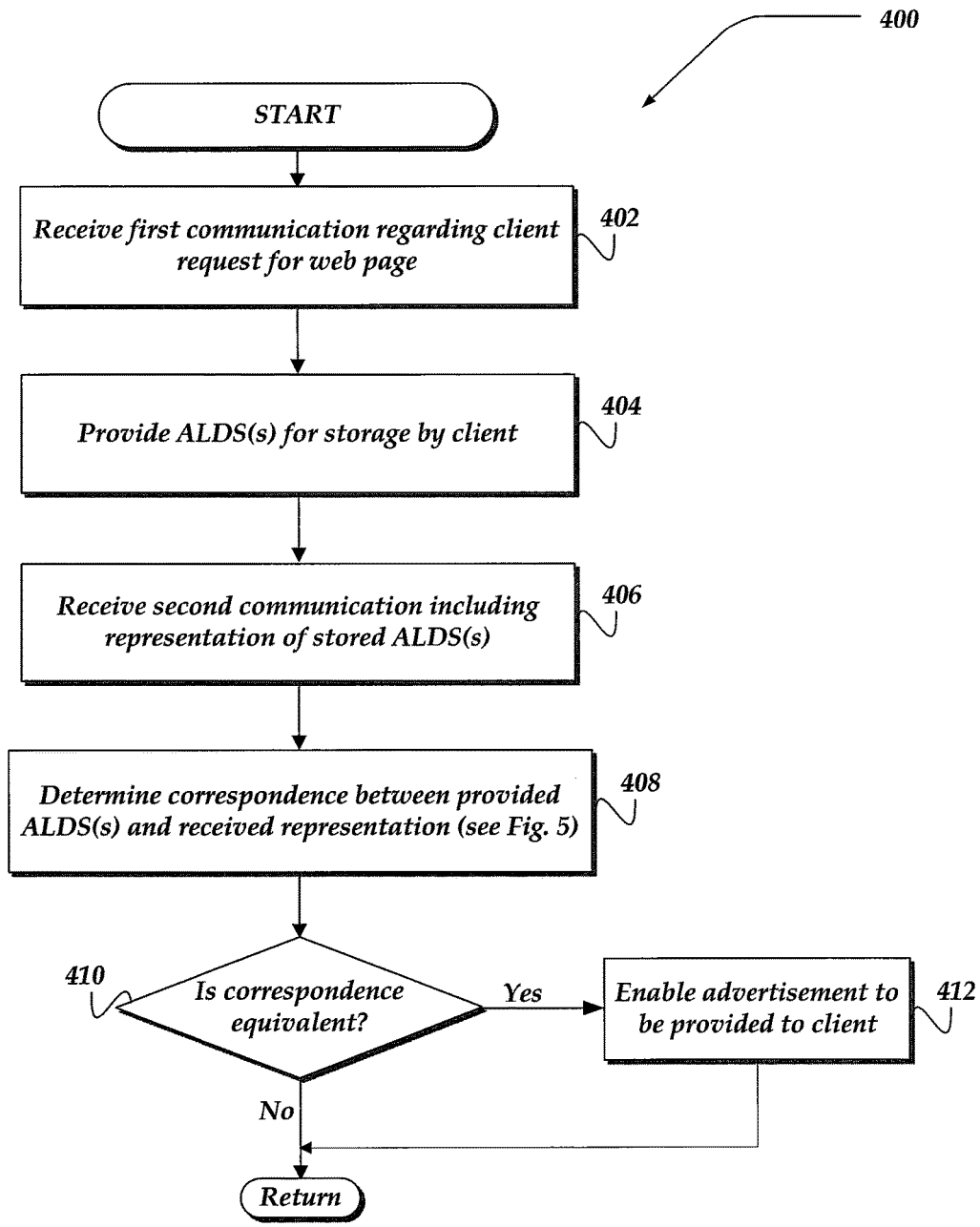
FIG. 4 illustrates a flow chart of an example embodiment and example overall process for determining that a user is enabled for persistent identification.
Figure 5:
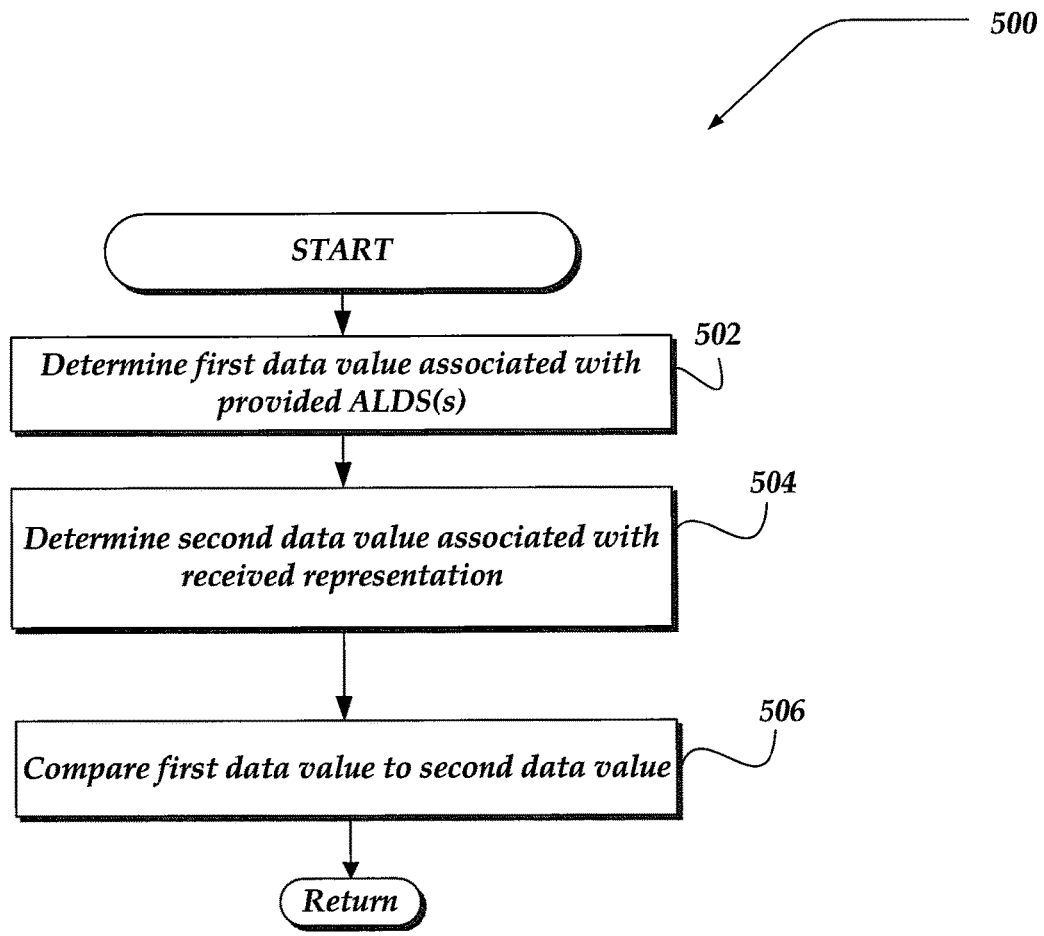
FIG. 5 illustrates a flow chart of an example embodiment for determining that a user is enabled for persistent identification.

FIG. 4 illustrates a flow chart of an example embodiment of a process for enabling application level, persistent identification of a client that requests a web page from a web site. Such a process may be executed on an exchange server such as exchange 108 of FIG. 1, and may be performed by an application such as ALDS processing module 348 executing within memory 332 of example server 300 as shown in FIG. 3. After the start of process 400 shown in FIG. 4, the process may at step 402 receive a first communication regarding a request by the client for a web page. In some embodiments, a request by the client for a web page may be in the form of an HTTP request sent from the client to a web server by a browser such as browser 248 executing on a client device such as clients 102-104. The web page may be associated with a web site owned, operated, and/or hosted by a data seller such as seller 106. In some embodiments, the requested web page may include particular content, in the form of metadata or otherwise, that may cause the first communication to be sent to exchange 108 when the client requests the web page. Such metadata may be in the form of an HTML <iframe> tag that includes a call to exchange 108, and that includes a reference to the web page requested. In some embodiments, such a tag may be included in the header and/or footer of the web page. For example, HTML for the requested web page may contain the following metadata tag:

<iframe src=tags.exchange.com/website . . . ret=html>

Such a tag may cause a call to the exchange server having address "tags.exchange.com", referencing the web page requested (e.g., "website") as well as other information regarding the request.

After receiving the first communication, process 400 may then proceed to step 404, where the process may provide at least one ALDS for storage by the client device, where the ALDS(s) identifies at least one characteristic of the client. The ALDS(s) may be a data structure that conforms to a particular format, for example an HTTP cookie. The ALDS(s) may also be another type of data structure that uniquely identifies the client device and/or the user. Non-limiting, non-exhaustive examples of an ALDS include a cookie (e.g., an HTTP cookie), a URL, a query string, a flash local stored object, or a session bean (e.g., a Java session bean), and any other data structure, as well as any portion of any of these that is accessible to programs at the application layer.

The ALDS(s) may be received and processed by a web browser in accordance with an application-level protocol, such as HTTP. In some embodiments, the ALDS may include data in a readable text format, for example where the ALDS is an HTTP cookie. The ALDS may include data in a binary and/or machine-readable format, or otherwise encoded in a particular format. The ALDS may be provided in a compressed format, such as the ZIP compression format. The data of the ALDS may be encrypted. Where the ALDS is provided in an encrypted or compressed format, the encryption and/or compression may be performed by exchange 108, by the ALDS processing module 348 or by some other software module or application. In some embodiments, more than one ALDS may be provided at step 404 for storage by the client, and the more than one ALDS may each include different data to be stored by the client. Examples of such multiple ALDSs are discussed herein with regard to FIG. 7.

In some embodiments, the at least one ALDS provided at step 404 may include information that identifies at least one characteristic of the client. Such a characteristic may include information identifying the client and/or the user uniquely, such as a unique identifier value (e.g. a numeric or alpha-numeric identifier). The characteristic may also include information regarding what web sites/pages the client has visited, and the number of times the client has visited each web site, as indicated by the URL of the web page visited, the IP address, or both. In some embodiments, the characteristic includes information regarding the particular interests shown by a user of a client visiting a web site. For example, if the user used its client browser to visit an online retailer (e.g. a data seller) and browsed for DVD recordings of horror films, the characteristic may indicate that the user is interested in DVDs and in particular interested in horror films. In some embodiments, the characteristic may indicate that the user's interests match a category of data that a data buyer has expressed interest in, and/or match a particular campaign by a data buyer to target advertisements to users. For example, if a data buyer has a campaign to provide advertisements to users interested in horror films, the ALDS(s) stored on that user's client may include a characteristic indicating that the user matches this particular campaign.

The at least one ALDS provided at step 404 may enable persistent identification of the client once it has been stored on the client, such that when the client browses to other web sites the data stored in the ALDS(s) permits the client to be identified as the same client that visited the first web site as indicated by the first communication received at step 402. In this way, the stored ALDS(s) may enable user data to be gathered for the client as it browses multiple web sites, the user data correlated for the client based on information in the ALDS(s) that uniquely identifies the client.

Process 400 may then proceed to step 406, and receive a second communication that includes a representation of the at least one ALDS that has been stored at the client following step 404. In some embodiments, the requested web page may include particular content, in the form of metadata or otherwise, that may cause the second communication to be sent to exchange 108 when the client requests the web page. As in step 402, such metadata may be in the form of an HTML <iframe> tag that includes a call to exchange 108, and that includes a reference to the web page requested. In some embodiments, such a tag may be included in the header and/or footer of the web page. For example, HTML for the requested web page may contain the following metadata tag:

<iframe src=tags.exchange.com/if?parm1= . . . >

Such a tag may cause a call to the exchange server having address "tags.exchange.com", the call including one or more parameters (e.g., "parm1") as well as other information regarding the request. In some embodiments, the first communication and second communication are initiated respectively by a first and second metadata element included in the same web page requested by the client. In this way, the single request by the user for the web page may spawn the two separate communications to the exchange 108.

The second communication received at step 406 may include a representation of the at least one ALDS provided at step 404 for storage at the client. In some embodiments, such representation may include data representing each of the ALDS(s) provided at step 404. In some embodiments, the representation may include data representing some but not all of the ALDS(s) provided at step 404. For example, if three ALDS(s) are provided for storage at step 404, the second communication may include a representation of one, two or all three of the previously provided ALDS(s). The second communication may also include one or more data values that are associated with or that uniquely identify the at least one ALDS(s), for example one or more checksum values derived from the data of the one or more ALDS(s). In some embodiments, such one or more data values may be utilized at step 408 to determine a correspondence between the ALDS(s) provided at step 404 and the representation of the ALDS(s) received at step 406. In some embodiments, because the second communication is prompted by a second <iframe> (or other metadata) tag that includes a request for the previously provided and stored ALDS(s), the representation included in the second communication corresponds to the client browser's attempt to send back the ALDS(s) previously stored. The client browser may be successful or unsuccessful in this attempt, depending on whether the client browser was able to successfully stored the ALDS(s) provided at step 404.

At step 408, the process 400 may determine a correspondence between the at least one ALDS provided at step 404, and the representation of the ALDS(s) received at step 406. In some embodiments, the correspondence may be determined through a process such as process 500 depicted in FIG. 5. Process 500 may begin by determining a first data value associated with the at least one ALDS at step 502. In some embodiments, the first data value is a checksum value or other type of numeric value that identifies the at least one ALDS based on the data that is stored in the ALDS. In some embodiments, the first data value may uniquely identify the at least one ALDS. Alternatively, the data value may be determined or calculated in such a way as to provide a numeric representation that is distinct enough to provide a certain level or threshold of confidence to the determination of the correspondence between the at least one ALDS and its representation. In some embodiments, where multiple ALDS(s) have been provided, step 502 may determine a first data value corresponding to each ALDS. In some embodiments, a single first data value may be determined that corresponds to all ALDS. And in some embodiments, a first data value may be determined that corresponds to only one of the ALDSs provided, or to a subset of the ALDSs provided.

Process 500 may proceed to step 504 and determine a second data value associated with the representation of the at least one ALDS received at step 406 of process 400. In some embodiments, the second data value is a checksum value or other type of data value that identifies or is associated with or is derived from the representation of the at least one ALDS received at step 406. In some embodiments, the second data value may be a numeric value that uniquely identifies the representation. Alternatively, the second data value may be determined in such a way as to provide a numeric value that is distinct enough to provide a certain level or threshold of confidence to the determination of the correspondence between the at least one ALDS and its representation. In some embodiments, where multiple ALDS(s) have been provided, step 504 may determine a second data value corresponding to a representation of each ALDS. In some embodiments, a single second data value may be determined corresponding to a representation of all ALDS(s) provided. And in some embodiments, a second data value may correspond to a representation of only one of the ALDSs provided, or to a subset of the ALDSs provided.

Process 500 then proceeds to step 506, where a comparison is made between the first and second data values determined at steps 502 and 504. In some embodiments, the process may determine whether there is a substantial equivalence between the first and second data values, to determine whether the ALDS(s) provided are a sufficient match to the representation of the ALDS(s) received in the second communication. In some embodiments, the process may determine an exact equivalence or match between the first and second data values. For example, where the first and second data values are numeric values such as a checksum, the process may find equivalence only when the checksums are the same. Moreover, in some embodiments the process may determine a relative equivalence that is less than exact, but above a certain threshold of correspondence between the first and second data values, such that the provided ALDS(s) are close enough to the received representation of the ALDS(s).

In some embodiments, the first data value(s) (e.g., checksum) corresponding to the ALDS(s) may be included in the second communication received at step 406 of process 400, along with the representation of the ALDS(s). In this case, the process may determine the second data values(s) corresponding to the representation of the ALDS(s) received in the second communication, and compare those determined second data value(s) to the first data value(s) included in the second communication to determine the relative equivalence. Further, in some embodiments it may not be necessary to store the first data value(s) at a server such as exchange 108. In some embodiments however, it may be advantageous (for security or other reasons) to store the first data value(s) at a server such as exchange 108.

Returning to process 400, at decision 410 a determination may be made as to whether the provided ALDS(s) are substantially equivalent to the representation of the ALDS(s) received in the second communication. In some embodiments, such a determination may be made as described with regard to FIG. 5, by determining whether data values corresponding to the ALDS(s) and the received representation are substantially equivalent. If it is determined at decision 410 that there is a substantial equivalence, then the process may proceed to step 412 to enable at least one advertisement to be provided to the client based on the at least one characteristic included in the provided ALDS(s). In some embodiments, a substantial equivalence between the provided ALDS(s) and the received representation may indicate that the client browser was able to successfully receive and store the ALDS(s) provided at step 404, and this may further indicate that the client is enabled for persistent identification through storage of ALDS(s).

In some embodiments, enabling at least one advertisement to be provided to the client may include making one or more modifications to the ALDS(s) stored at the client, such modifications indicating that the client is enabled to receive advertisements from one or more data buyers or other entities who may operate an advertising server such as advertising server 112. Such modifications may also indicate the particular interests of the user determined through the browsing activities of the client at the web page. For example, if the client was viewing pages related to purchasing horror film DVDs, the modifications made to the ALDS(s) may indicate the user's interest in DVDs and/or horror films in particular. In some embodiments, enabling at least one advertisement to be provided to the client includes storing at a server (e.g. exchange 108) an indication that the client is enabled to receive advertisements generally, or advertisements related to particular topics, interests or categories of user data. In some embodiments, enabling at least one advertisement to be provided to the client device may include enabling the providing of the content of the originally requested web page including certain content such as a pixel (e.g. a beacon) to facilitate the collection, correlation and selling of user data for the client.

Through the operation of a process such as process 400, a determination may be made whether the client device is enabled for persistent identification (e.g., whether the client's browser is configured to accept and store ALDS(s) on the client device). Inclusion of two separate metadata elements (e.g. <iframe> tags) in the code of a single web page may enable the process described herein to be carried out during the client's first (and in some cases, only) visit to the web page, and thus may enable user data to be collected for the client and advertisements to be targeted at the client following this first visit.

Figure 6:
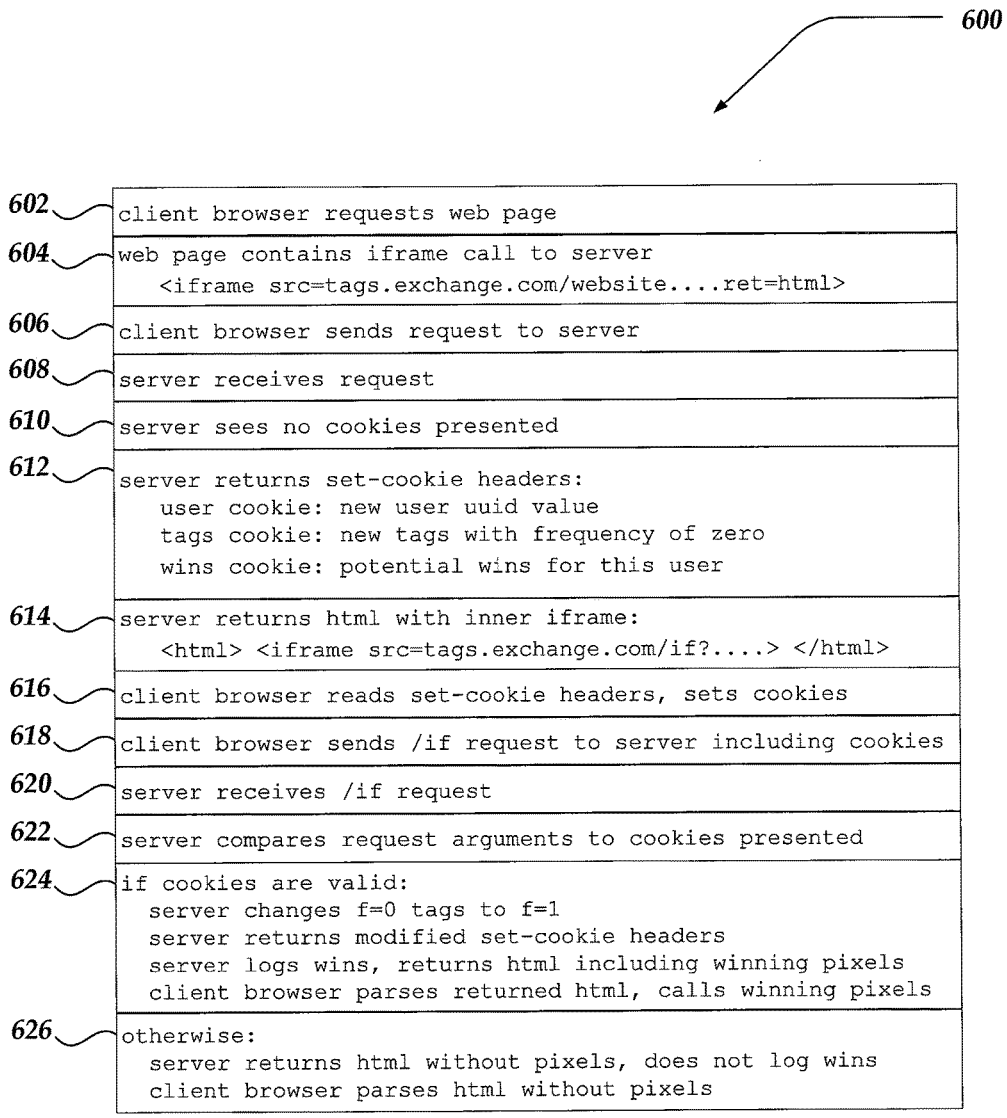
FIG. 6 illustrates an example of pseudo-code for determining that a user is enabled for persistent identification.

FIG. 6 provides a somewhat more detailed depiction of an embodiment of the inventive process, by depicting the process in pseudo-code that may provide a framework for implementing the process of FIG. 4. In this example, the ALDS(s) are cookies, and the metadata elements that enable the first and second communications of process 400 are HTML <iframe> tags. At block 602 of FIG. 6, the client browser requests a particular web page. As shown in block 604, the web page may include a particular metadata element such as an iframe tag that causes a request (e.g. the first communication of step 402) to be made at block 606 to a server such as exchange server 108. This first iframe call may include information about the website visited (e.g. the URL or other identification of the site), and may include other information regarding the client. The server receives the request (e.g. the first communication) at block 608, and determines that the request includes no cookies at block 610. If it is determined that this request includes no cookies at block 610, this may provide an indication to the server that this particular client has not yet visited this site or any other site likewise configured to collect data regarding the user. In other words, this may be the first time the server has received any information regarding this particular client.

Figure 7:
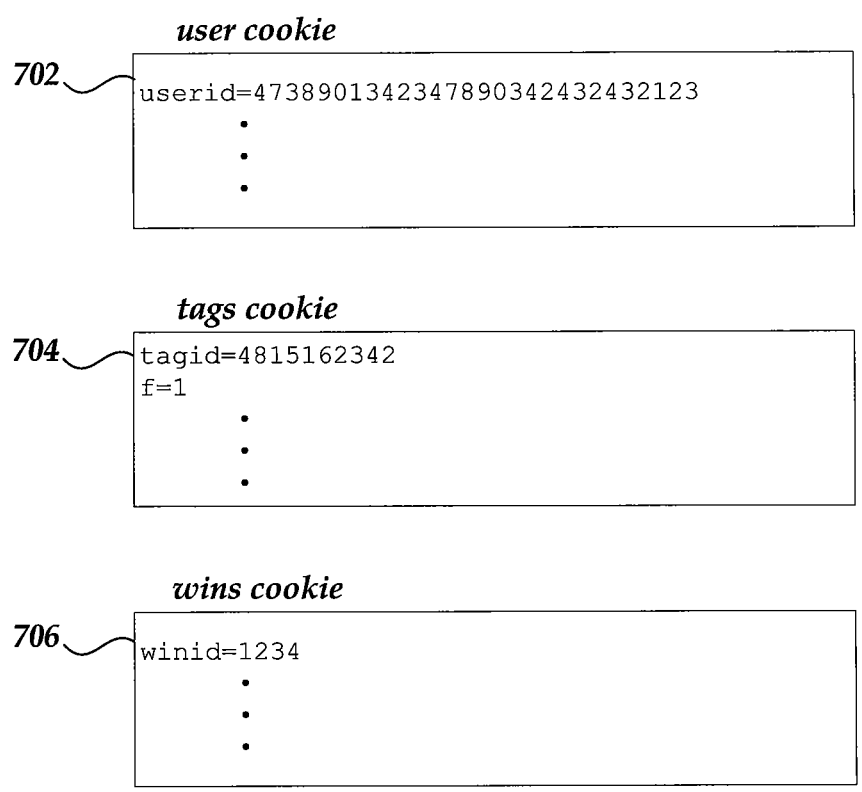
FIG. 7 illustrates examples of application level data structures (ALDS) that may be employed in some embodiments of the invention.

At block 612, the server may return HTML to the client browser including set-cookie header data to store certain cookies on the client device. In this example, three cookies are stored on the client device: a user cookie, a tags cookie, and a wins cookie. These three types of cookies are depicted in FIG. 7. The user cookie, as shown in element 702, may include a unique identifier (e.g., a userid) for the user/client. This userid may be a random number generated for the user at exchange 108. Userid may also include data such as a timestamp indicating the date/time when the request was received. Userid may also include data that identifies the web site visited by the user (e.g., a numeric id of the web site). In some embodiments, the userid may include all three elements—the random number, the timestamp, and the numeric identifier of the web site—to provide a more reliably unique and/or secure identifier for the user.

The tags cookie, as shown in element 704, may include information regarding what is known about the user's interests based on the user's browsing activities through the client device. For example, if the user has browsed for horror film DVDs at the current web site or another web site, the tags cookie may include information indicating the user's interest in films, DVDs and/or horror films in particular. These interests may be considered as categories of user data, and may be represented in a numeric form in the tags cookie. For example, the tags cookie may include data "tagid=4815162342". The process may read this data from the tags cookie, and using a mapping (e.g. a lookup table) stored on the exchange server determine that tagid=4815162342 corresponds to a user interest in horror films, and therefore determine that the user's browsing history indicates the user's interest in horror films. In some embodiments, the tags cookie may store a random number, and that random number may be correlated with a user interest/category through a mapping stored at exchange server 108. In some embodiments, the tags cookie may also include data indicating a frequency or number of times that the user has browsed for information regarding a particular category or interest. An example is provided in element 704 of FIG. 7, showing an exemplary tags cookie that includes data f=1 stored with tagid=4815162342, indicating that the user has browsed once for information regarding the interest or category corresponding to tagid 4815162342.

The wins cookie, as shown in element 706, may store information indicating whether the user's interests/categories correspond to any current data campaigns of data buyers. For example, if data buyer X has an active campaign (campaign id=1234) to provide ads regarding horror films, the wins cookie stored on the client may include "1234" indicating that the data buyer may wish to provide horror film-related ads to the client. Generally, the wins cookie may include information indicating that the client matches zero, one or many ad campaigns, depending on the user's interests and/or browsing activities as indicated by the data stored in the tags cookie, and the correspondence of those interests with any active campaigns of data buyers.

As shown in block 614 of FIG. 6, the server may return HTML that also includes a second iframe tag. This second iframe tag may include parameters instructing the client to return the three cookies previously sent. In some embodiments, this second iframe tag may also include data that is a numeric representation (e.g. a checksum) of one or more of the cookies. At block 616, the client browser may read the set-cookie header information sent by the server in block 612, and set the cookies on the client. At block 618, the client may send to the server a request in response to the second iframe, the response including a representation of the cookies that the client was instructed to set at block 612. In some embodiments, the response sent at block 618 may also include the one or more numeric representations (e.g. checksums) of the cookies specified in the second iframe tag. In some embodiments, such numeric representations may be stored on the server.

At block 620, the server receives the response and, at block 622, compares the arguments of the request to the cookies. As described with regard to steps 406 and 408 of FIG. 4, this comparison may include calculating one or more data values (e.g. numeric values such as checksums) for the cookies received from the client and comparing these values to the data values of the original cookies. If the received cookies are determined to be valid, e.g. if the received cookies are relatively equivalent to those that were set previously, then it is determined that the client is enabled for third party cookies, and user data may be collected for this client and sold to data buyers.

Different conditions may apply when the cookies are determined to be invalid, e.g. when it is determined that there is not a relative equivalence between the cookies sent and the cookies (or representations of the cookies sent back). For example, the representation of the cookies sent at block 618 may be null data, indicating that the client did not set the cookies as instructed. In some cases, the client may return cookies other than the cookies it was instructed to set, for example if the client had set cookies previously while visiting a different web site and the client browser was unable to overwrite those older cookies at block 616. In other instances, the browser may be able to set only some of the cookies (e.g., only the user cookie but not the tags or wins cookies). In such a case, there may be a negative determination of correspondence if the client browser is unable to set every cookie as instructed. Generally, the process may determine that the client is unable to set cookies in response to an instance where the client returns corrupted, old, null or otherwise different cookies than those it was instructed to set.

At block 624, if it is determined that the cookies in the response are valid (e.g., if there is a relative equivalence between the cookies sent and the cookies received back), then the process may make one or more modifications to the stored cookies to indicate that the client is able to set cookies and thus that the user's data may be collected. For example, the tags cookie may have its frequency attributed incremented from zero to one for the tag corresponding to a particular user interest or category that the user demonstrated in this browsing session. The process may also modify the wins cookie to indicate that the user may be suitable to receive ads related to this particular interest. At block 624, the server may also return HTML that includes a pixel (e.g. beacon). This pixel may comprise a 1×1 item of content that indicates that the exchange may sell user data for this user to a data buyer, and further facilitates the collection and selling of the user's data.

Moreover, in some embodiments at block 604 if it is determined that the client already has cookies set, the process may examine the data contained in the cookies to determine if the cookies contain valid data for the user (e.g., if they correspond to the known format for cookies set as part of the process). If it is determined that the cookies contain corrupted data or otherwise do not correspond to the desired data format, these corrupted cookies may be discarded and the process may proceed as if the request contained no cookie data at all (as described with regard to block 610).

It will be understood that each block or step of the flowchart illustrations, and combinations of blocks/steps in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Because many embodiments of the invention can be made without departing from the spirit and scope of the invention, the invention resides in the claims hereinafter appended.

What is claimed as new and desired to be protected by Letters Patent of the United States is:

1. A method for enabling application level persistent identification of a client device that requests a web page over a network, wherein a network device performs actions, comprising:

receiving, at a network device and from the client device, a request from a web browser application at a client device for an instruction to set a cookie to a cookie value at the client device, wherein the request is initiated by a first metadata element of a web page loaded by the web browser application at the client device before cookie storage has been verified as enabled for one or more web sites for the client device, the web page further including a second metadata element, loaded by the web browser application, coincident to loading the first metadata element, configured to detect and transmit contents of a cookie;

in response to receiving the request, sending, by the network device, an instruction to the web browser application at the client device to set the cookie to a cookie value;

in response to the second metadata element detecting contents of the cookie on the client device and subsequently transmitting the contents of the cookie to the network device, receiving, at the network device, a communication comprising the contents of the cookie;

determining, by comparing the contents of the cookie to the cookie value that the cookie is validated; and transmitting, to the client device, one or more modifications to the cookie on the client device to produce a modified cookie, the one or more modifications to the cookie verifying that the client device is enabled to be tracked via the modified cookie, wherein transmitting the one or more modifications to the cookie causes:
one or more content provider devices to receive at least one of the one or more modifications to the cookie; and
the one or more content provider devices to transmit, based on receiving the at least one of the one or more modifications to the cookie, one or more advertisements to a web browser at the client device, the one or more advertisements being identified based on the at least one of the one or more modifications to the cookie.

2. The method of claim 1, wherein comparing the contents of the cookie to the cookie value further comprises:
determining at least one first data value associated with the cookie value;
determining at least one second data value associated with the contents of the cookie; and
comparing the at least one first data value to the at least one second data value.

3. The method of claim 2, wherein the at least one first data value and the at least one second data value are checksums.

4. The method of claim 1, further comprising sending content for display within the web page to the client device.

5. A processor readable non-transitory storage media that stores executable instructions that enable actions for enabling application level persistent identification of a client device that requests a web page, the executable instructions when executed perform actions comprising:
receiving, at a network device and from the client device, a request from a web browser application at a client device for an instruction to set a cookie to a cookie value at the client device, wherein the request is initiated by a first metadata element of a web page loaded by the web browser application at the client device before cookie storage has been verified as enabled for one or more web sites for the client device, the web page further including a second metadata element, loaded by the web browser application, coincident to loading the first metadata element, configured to detect and transmit contents of a cookie;

in response to receiving the request, sending, by the network device, an instruction to the web browser application at the client device to set the cookie to a cookie value;

in response to the second metadata element detecting contents of the cookie on the client device and subsequently transmitting the contents of the cookie to the network device, receiving, at the network device, a communication comprising the contents of the cookie;

determining, by comparing the contents of the cookie to the cookie value that the cookie is validated; and transmitting, to the client device, one or more modifications to the cookie on the client device to produce a modified cookie, the one or more modifications to the cookie verifying that the client device is enabled to be tracked via the modified cookie, wherein transmitting the one or more modifications to the cookie causes:
one or more content provider devices to receive at least one of the one or more modifications to the cookie; and
the one or more content provider devices to transmit, based on receiving the at least one of the one or more modifications to the cookie, one or more advertisements to a web browser at the client device, the one or more advertisements identified based on the at least one of the one or more modifications to the cookie.

6. The processor readable non-transitory storage media that stores executable instructions that enable actions for enabling application level persistent identification of a client device that requests a web page of claim 5, wherein comparing the contents of the cookie to the cookie value further-comprises:
determining at least one first data value associated with the cookie value;
determining at least one second data value associated with the contents of the cookie; and
comparing the at least one first data value to the at least one second data value.

7. The processor readable non-transitory storage media that stores executable instructions that enable actions for enabling application level persistent identification of a client device that requests a web page of claim 6, wherein the at least one first data value and the at least one second data value are checksums.

8. The processor readable non-transitory storage media that stores executable instructions that enable actions for enabling application level persistent identification of a client device that requests a web page of claim 5, further comprising sending content for display within the web page to the client device.

9. The processor readable non-transitory storage media that stores executable instructions that enable actions for enabling application level persistent identification of a client device that requests a web page of claim 5, wherein content for display within the web page includes at least one pixel.

10. The processor readable non-transitory storage media that stores executable instructions that enable actions for enabling application level persistent identification of a client device that requests a web page of claim 5, wherein the cookie value is transmitted in a compressed form.

11. The processor readable non-transitory storage media that stores executable instructions that enable actions for enabling application level persistent identification of a client device that requests a web page of claim 5, wherein the cookie value is transmitted in an encrypted form.

12. An apparatus for enabling application level persistent identification of a client device that requests a web page, comprising:
a processor device;
a communication interface device that enables communication between the processor device and a network; and a memory in communication with the processor device, storing instructions executable by the processor device to enable actions, including:

receiving, at a network device and from the client device, a request from a web browser application at a client device for an instruction to set a cookie to a cookie value at the client device, wherein the request is initiated by a first metadata element of a web page loaded by the web browser application at the client device before cookie storage has been verified as enabled for one or more web sites for the client device, the web page further including a second metadata element, loaded by the web browser application, coincident to loading the first metadata element, configured to detect and transmit contents of a cookie;

in response to receiving the request, sending, by the network device, an instruction to the web browser application at the client device to set the cookie to a cookie value;

in response to the second metadata element detecting contents of the cookie on the client device and subsequently transmitting the contents of the cookie to the network device, receiving, at the network device, a communication comprising the contents of the cookie;

determining, by comparing the contents of the cookie to the cookie value that the cookie is validated; and transmitting, by the network device and to the client device, one or more modifications to the cookie on the client device to produce a modified cookie, the one or more modifications verifying that the client device is enabled to be tracked via the modified cookie, wherein transmitting the one or more modifications to the cookie causes:

one or more content provider devices to receive at least one of the one or more modifications to the cookie; and the one or more content provider devices to transmit, based on receiving the at least one of the one or more modifications to the cookie, one or more advertisements to a web browser at the client device, the one or more advertisements identified based on the at the at least one of the one or more modifications to the cookie.

13. The apparatus of claim 12, wherein comparing the contents of the cookie to the cookie value further comprises:
determining at least one first data value associated with the cookie value;
determining at least one second data value associated with the contents of the cookie; and
comparing the at least one first data value to the at least one second data value.

14. The apparatus of claim 13, wherein the at least one first data value and the at least one second data value are checksums.

15. The apparatus of claim 12, further comprising sending content for display within the web page to the client device.

16. The apparatus of claim 12, wherein content for display within the web page includes at least one pixel.

17. The apparatus of claim 12, wherein the cookie value is transmitted in a compressed form.

18. The apparatus of claim 12, wherein the cookie value is transmitted in an encrypted form.

19. A system for enabling application level persistent identification of a client device that requests a web page, comprising:
the client device; and
a server device in communication with the client device, wherein the server device is configured to perform actions including:

receiving, at a network device and from the client device, a request from a web browser application at a client device for an instruction to set a cookie to a cookie value at the client device, wherein the request is initiated by a first metadata element of a web page loaded by the web browser application at the client device before cookie storage has been verified as enabled for one or more web sites for the client device, the web page further including a second metadata element, loaded by the web browser application, coincident to loading the first metadata element, configured to detect and transmit contents of a cookie;

in response to receiving the request, sending, by the network device, an instruction to the web browser application at the client device to set the cookie to a cookie value;

in response to the second metadata element detecting contents of the cookie on the client device and subsequently transmitting the contents of the cookie to the network device, receiving, at the network device, a communication comprising the contents of the cookie;

determining, by comparing the contents of the cookie to the cookie value that the cookie is validated; and transmitting, from the network device and to the client device, one or more modifications to the cookie on the client device to produce a modified cookie, the one or more modifications to the cookie verifying that the client device is enabled to be tracked via the modified cookie, wherein transmitting the one or more modifications to the cookie causes:

one or more content provider devices to receive at least one of the one or more modifications to the cookie; and the one or more content provider devices to transmit, based on receiving the at least one of the one or more modifications to the cookie, one or more advertisements to a web browser at the client device, the one or more advertisements identified based on the at least one of the one or more modifications to the cookie.

20. The system claim 19, wherein comparing the contents of the cookie to the cookie value further comprises:
determining at least one first data value associated with the cookie value;
determining at least one second data value associated with the contents of the cookie; and
comparing the at least one first data value to the at least one second data value.

21. The system of claim 20, wherein the at least one first data value and the at least one second data value are checksums.

22. The system of claim 19, further comprising sending content for display within the web page to the client device.

23. The system of claim 19, wherein content for display within the web page includes at least one pixel.

* * * * *